Dec. 24, 1935.   L. B. CHRISTMAN ET AL   2,025,040
AUTOMOBILE AXLE CONSTRUCTION
Filed Aug. 25, 1930
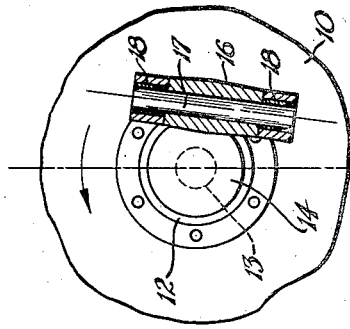
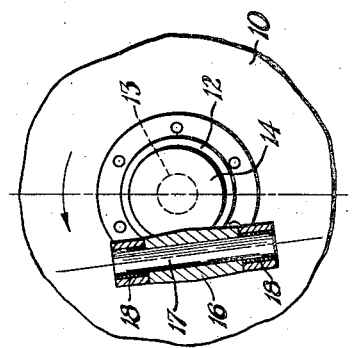
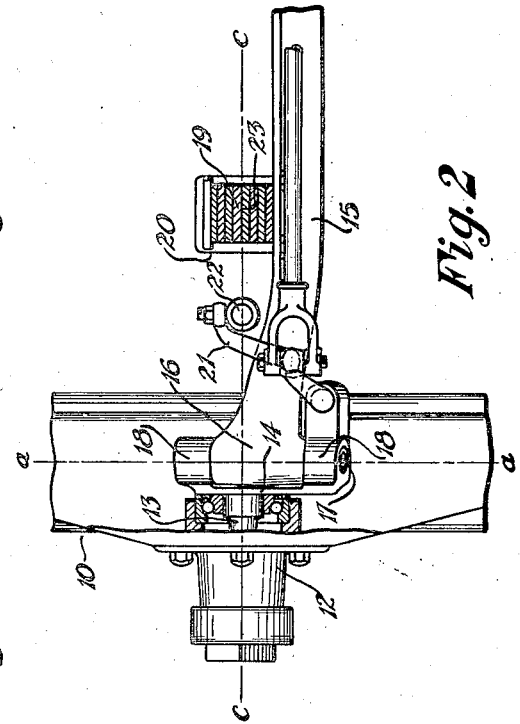
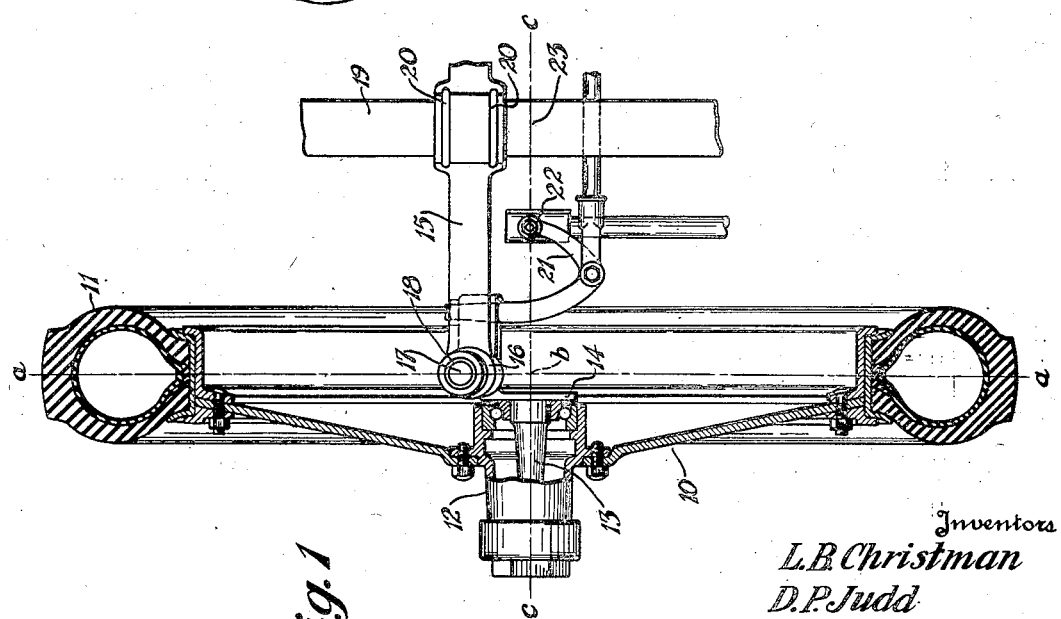
Inventors
L. B. Christman
D. P. Judd
C. K. Stoner
By Frear and Bishop
Attorneys Patented Dec. 24, 1935

2,025,040

UNITED STATES PATENT OFFICE 2,025,040

AUTOMOBILE AXLE CONSTRUCTION

Lowell B. Christman, Desal P. Judd, and Chester K. Stoner, Canton, Ohio

Application August 25, 1930, Serial No. 477,488

9 Claims. (Cl. 280—96.3)

The invention relates to the steering wheels of motor cars and other power driven vehicles, and more particularly to a novel axle construction for such wheels especially designed to increase the trailing effect of the steering wheels and to minimize road shock and "shimmying" of the wheels.

The object of the improvement is to provide what is commonly called a caster wheel, by locating the king pin offset from the axle spindle, the axis of the king pin being inclined upward away from the spindle, thus creating a tendency for the wheels actuated by the steering mechanism to revert to a straight ahead position.

This object may be attained by locating the king pin axis behind the spindle around which the wheel revolves and inclining the king pin axis backward at its upper end; or by locating the king pin axis in front of the spindle and inclining the king pin axis forward at its upper end.

Another object is to provide an arrangement which causes road impacts to be delivered directly in line with and directly against the axis of the king pin, as impacts thus delivered have no "lever arm" around the king pin axis and therefore cannot induce rotation of the wheel mass around the king pin as an axis.

This object may be attained by locating the king pin axis within the middle plane or disk of the wheel and tire, this disk being determined by and including the middle ribbon of theoretical contact between tire and road, and is perpendicular or approximately perpendicular to the road.

A still further object is to so arrange and relatively position the parts that the axis of the spindle about which the wheel revolves, the center of the ball joint of the bell crank arm, and the axis about which the spring and axle tend to rotate due to road impacts transmitted through the wheel, are all located in an imaginary axis extending from the axis around which the one wheel revolves to the homologous axis of the opposite wheel, whereby the tendency of road impacts to be transmitted through the wheels into the steering apparatus is reduced to a minimum.

An embodiment of the invention thus set forth, in general terms, is illustrated in the accompanying drawing, in which Figure 1 is a plan sectional view of an automobile wheel provided with the improved axle construction to which the invention pertains;

Fig. 2, a vertical sectional view of the same;

Fig. 3, a fragmentary elevation of the hub portion of the wheel showing the king pin axis located behind the spindle around which the wheel rotates; and Fig. 4, a similar view showing the king pin located in front of the spindle.

Similar numerals refer to similar parts throughout the drawing.

A steering wheel of conventional type is indicated generally at 10, provided with the usual tire 11 and hub portion 12, journalled upon the axle spindle 13, which is carried by the spindle head 14.

The axle is shown at 15, and for the purpose of the invention, is provided at its end, adjacent to the wheel, with an inclined bearing 16, within which the king pin 17 is journalled.

For the purpose of supporting the axle upon the wheel spindle a pair of spaced bearings 18 are carried by the spindle head for receiving the end portions of the king pin.

These bearings are offset from the axis of the spindle 13 and located in alignment with the bearing 16 of the axle, whereby the king pin axis is offset from the axis of the spindle and inclined upward away from the spindle, producing a caster wheel which induces a tendency of the wheel to revert to a straight ahead position.

This effect may be obtained by locating the king pin either behind or in front of the axle spindle and inclining the upper end thereof away from the spindle.

As shown in Fig. 3, the king pin may be located behind the axle spindle, with its upper end inclined backward; or it may be located in front of the spindle, as shown in Fig. 4, with its upper end inclined forward.

In order to cause road impacts to be delivered directly in line with, and directly against the axis of the king pin, so that they will have no "lever arm" around the king pin, and thus cannot induce rotation of the wheel mass around the king pin as an axis, the king pin axis is located within the middle plane, or disk, of the wheel and tire, indicated by the broken line a—a in Figures 1 and 2.

This plane is determined by and includes the middle ribbon of theoretical contact between the tire and road, as indicated at b in Fig. 1; and the plane or disk a—a is perpendicular, or approximately perpendicular to the road, as shown in the drawing.

A portion of one spring, of any usual and well known design, is shown at 19, connected to the axle by the clips 20, as in ordinary practice. The bell crank of the steering apparatus is shown at 21, provided with the usual ball joint 22.

In order to further reduce, to a minimum, the tendency of road impacts to be transmitted through the wheels into the steering apparatus, the center of the ball joint 22, and the point or axis, shown at 23, around which the spring and axle structure tend to rotate due to road impacts through the wheels, should be located in an imaginary line, indicated at c—c, in Figures 1 and 2, passing longitudinally through the axis around which one wheel revolves and extending to the homologous axis of the opposite wheel.

Preferably the king pin is located at such an angle to the perpendicular that a line extending from the axis thereof will approximately converge with a perpendicular line through the spindle axis, at the point of contact of the tire with the road.

The angle of the king pin axis and amount of offset from the spindle may be varied to either increase the trailing effect of the wheel or increase the ease of steering of the vehicle, as desired.

We claim:

1. A wheel and axle construction including a substantially vertical wheel, a spindle around which the wheel revolves, a king pin offset from the spindle and inclined away from the spindle at its upper end, an axle upon which the king pin is carried, a spring mounted upon the axle, and a bell crank provided with a ball joint, the axis about which the spring and axle structure tend to rotate due to road impacts transmitted through the wheel, and the center of said ball joint being located in an imaginary line extending through the axis of the spindle.

2. A wheel and axle construction including a substantially vertical wheel, a spindle around which the wheel revolves, a king pin located behind the spindle and inclined rearward at its upper end, an axle upon which the king pin is carried, a spring mounted upon the axle, and a bell crank provided with a ball joint, the axis about which the spring and axle structure tend to rotate due to road impacts transmitted through the wheel, and the center of said ball joint being located in an imaginary line extending through the axis of the spindle.

3. A wheel and axle construction including a substantially vertical wheel, a spindle around which the wheel revolves, a king pin offset from the spindle and inclined away from the spindle at its upper end, an axle upon which the king pin is carried, the king pin axis being located within the middle plane of the wheel, a spring mounted upon the axle, and a bell crank provided with a ball joint, the axis about which the spring and axle structure tend to rotate due to road impacts transmitted through the wheel, and the center of said ball joint being located in an imaginary line extending through the axis of the spindle.

4. A wheel and axle construction including a substantially vertical wheel, a spindle around which the wheel revolves, a king pin located behind the spindle and inclined rearward at its upper end, an axle upon which the king pin is carried, the king pin axis being located within the middle plane of the wheel, a spring mounted upon the axle, and a bell crank provided with a ball joint, the axis about which the spring and axle structure tend to rotate due to road impacts transmitted through the wheel, and the center of said ball joint being located in an imaginary line extending through the axis of the spindle.

5. A wheel and axle construction including a substantially vertical wheel, a spindle around which the wheel revolves, a king pin located in front of the spindle and inclined forward at its upper end, an axle upon which the king pin is carried, a spring mounted upon the axle, and a bell crank provided with a ball joint, the axis about which the spring and axle structure tend to rotate due to road impacts transmitted through the wheel, and the center of said ball joint being located in an imaginary line extending through the axis of the spindle.

6. A wheel and axle construction including a substantially vertical wheel, a spindle around which the wheel revolves, a king pin offset from the spindle and inclined away from the spindle at its upper end, said king pin being located in a plane parallel to the normal plane of the wheel, an axle upon which the king pin is carried, a spring mounted upon the axle, the axis about which the spring and axle structure tend to rotate due to road impacts transmitted through the wheel being located in an imaginary line extending through the axis of the spindle.

7. A wheel and axle construction including a substantially vertical wheel, a spindle around which the wheel revolves, a king pin located behind the spindle and inclined rearwardly at its upper end, said king pin being located in a plane parallel to the normal plane of the wheel, an axle upon which the king pin is carried, a spring mounted upon the axle, the axis about which the spring and axle structure tend to rotate due to road impacts transmitted through the wheel being located in an imaginary line extending through the axis of the spindle.

8. A wheel and axle construction including a substantially vertical wheel, a spindle around which the wheel revolves, a king pin offset from the spindle and inclined away from the spindle at its upper end, an axle upon which the king pin is carried, the king pin axis being located within the middle plane of the wheel and in a plane parallel to the normal plane of the wheel, a spring mounted upon the axle, the axis about which the spring and axle structure tend to rotate due to road impacts transmitted through the wheel being located in an imaginary line extending through the axis of the spindle.

9. A wheel and axle construction including a substantially vertical wheel, a spindle around which the wheel revolves, a king pin located behind the spindle and inclined rearwardly at its upper end, an axle upon which the king pin is carried, the king pin axis being located within the middle plane of the wheel and in a plane parallel to the normal plane of the wheel, a spring mounted upon the axle, the axis about which the spring and axle structure tend to rotate due to road impacts transmitted through the wheel being located in an imaginary line extending through the axis of the spindle.

LOWELL B. CHRISTMAN.
DESAL P. JUDD.
CHESTER K. STONER.